April 4, 1939.　　　　L. NAVIAS　　　　2,153,000

CERAMIC BODY

Filed Feb. 12, 1936

Inventor:
Louis Navias,
by Harry E. Dunham
His Attorney.

Patented Apr. 4, 1939

2,153,000

UNITED STATES PATENT OFFICE 2,153,000

CERAMIC BODY

Louis Navias, Schenectady, N. Y., assignor to General Electric Company, a corporation of New York Application February 12, 1936, Serial No. 63,527

3 Claims. (Cl. 200—152)

The present invention relates to a refractory ceramic particularly useful in electrical switching devices and to a method of preparing the same.

It is an object of my invention to provide a ceramic body capable of being wet by glass and having a coefficient of thermal expansion sufficiently close to a selected glass to permit a satisfactory seal to be made between them.

It is a further object of the invention to produce a ceramic having the above requirements, which is highly resistant to heat shock, and in which shrinkage during heat treatment is practically negligible.

In accordance with my invention a ceramic of the desired quality may be prepared by combining a granular refractory material having a higher coefficient of expansion than the selected glass with a vitrifiable bonding material having a lower coefficient of expansion to obtain a composite body, the coefficient of which is intermediate between those of its constituents. In particular, I have found that a ceramic having a coefficient of expansion sufficiently close to that of a standard lead glass of the type exemplified by Corning G-1 glass may be produced by combining magnesia with clay or with an equivalent vitrifiable binder.

Figure 1:
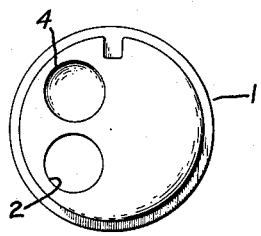
Figure 2:
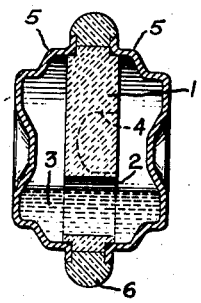

In the drawing Fig. 1 illustrates an article of manufacture comprising my improved ceramic, while Fig. 2 shows in section the application of the same to a liquid contact switching device.

In order to obtain a magnesia composition having the desired characteristics and, particularly, a minimum of shrinkage, I have found that it is highly desirable to use fused magnesia rather than magnesia of other origin. By the term "fused magnesia" I intend to specify magnesia which has been melted to the fusing point, cooled, crushed and ground to a finely divided condition. The resultant powder should thereafter be fired at a temperature preferably in excess of about 1200° C. to assure complete dehydration.

One mixture which I have found to give a desired expansion coefficient for use with G-1 glass consists of from 65 to 70 per cent magnesia in combination with a complementary proportion of a vitrifiable bonding material, such as clay. The latter constituent may suitably consist entirely of ball-clay or of china-clay, or may alternatively comprise a mixture of such clays.

In combining these materials I first disperse the clay, which should be in a finely divided state, in a suitable quantity of water, after which the fused magnesia powder may be added. Thorough admixture of the ingredients is assured by tumbling them for a short period in a ball mill. In order to permit as little hydration of the magnesia as possible the mixture formed by the above procedure should be freed of water, as by filter pressing, and then dried completely by placing in an oven at a temperature of about 100° C.

To render this combination readily moldable I prefer to add a few per cent of a temporary binder such, for example, as paraffin wax dissolved in carbon tetrachloride. The volatile constituents of the binder may then be immediately removed by exposure of the entire mass to a current of warm air. Portions of this composition may be placed in molds of desired shape and size and exposed to a sufficient degree of pressure to insure a compactly molded product. Thereafter, the molded articles should be fired at a temperature between 1200° C. and 1400° C. to remove the temporary binder and to vitrify the clay ingredients, thus bonding all the parts together. A firing time of as little as 3 minutes has been found to be sufficient to produce a highly durable and uniform product.

Ceramic bodies prepared as outlined above are found to be extraordinarily free from shrinkage and after the firing process still conform almost exactly to the dimensions of the mold. This attribute, together with the resulting freedom from size variations, is of extreme importance in the applications to which articles prepared in accordance with my invention have been found particularly applicable.

While I have in the foregoing specified a particular range of percentages of refractory material, this range is not to be regarded as limiting since other proportions may be used depending on the thermal characteristics of the glass to be matched. Furthermore, although clay is most conveniently used, other natural or synthetic vitrifiable substances may be employed. For example, I have produced in accordance with the invention very satisfactory ceramic bodies in which a portion or all of the clay is replaced by an equivalent percentage of feldspar.

In Fig. 1 I have shown a molded button I adapted to serve as an interrupting barrier for a liquid contact medium, and in Fig. 2 a barrier of this type is shown as incorporated in a complete switch unit of the form described and claimed in copending application, Serial No. 759,527, J. H. Payne, Jr., filed December 28, 1934 on which Patent 2,101,092 was granted December 7, 1937. It will be readily understood that the functions of the barrier 1 and the aperture 2 are respectively to complete and to interrupt the electrical continuity of the mercury pool 3 upon successive rotations of the switch unit. The depression 4 is provided as a means of compensating for variations in mercury level caused by changes in the degree of immersion of the aperture 2. It is an important characteristic of devices of this type that the enclosure formed by the dished metal receptacles 5 should be completely gas tight. This requirement can be realized under conditions of mass production only if the material of the barrier 1 is such as to have a coefficient of expansion closely matching that of the sealing glass ring 6, and capable of being wet by the same.

As previously indicated these conditions are fully met by my improved ceramic. Furthermore, the fact that the material of my invention can be depended upon to produce refractory barriers of uniform size and quality greatly reduces the number of switches which have to be rejected because of imperfect matching of parts.

While I have shown a particular form to which the invention may be adapted, it should be understood that it is in no way limited thereto. I therefore intend by the appended claims to cover all such equivalent modifications as fall within the true spirit and scope of my invention.

What I claim as new and desire to secure by Letters Patent of the United States, is:—

1. An interrupting element for a liquid contact switch, said element consisting essentially of fused magnesia and a vitreous bonding material.

2. An interrupting element for a liquid contact switch, said element consisting essentially of from 65 to 70% fused magnesia and a complementary proportion of clay.

3. A switch of the type which comprises a multi-part enclosure, a quantity of mercury acting as a contact medium within the enclosure, a quantity of glass joining the parts of the enclosure and a circuit interrupting barrier sealed to the glass and supported in place thereby, wherein the said barrier consists essentially of fused magnesia and a vitreous bonding material combined in such proportions as to have a coefficient of expansion comparable to that of the glass.

LOUIS NAVIAS.